United States Patent [19]

Koos, Jr.

[11] Patent Number: 4,472,667

[45] Date of Patent: Sep. 18, 1984

[54] D.C. SERVO MOTOR SPEED REGULATOR

[75] Inventor: William M. Koos, Jr., Orlando, Fla.

[73] Assignee: Burroughs Corporation, Detroit, Mich.

[21] Appl. No.: 523,195

[22] Filed: Aug. 15, 1983

[51] Int. Cl.³ .............................................. G05B 5/00
[52] U.S. Cl. .................................. 318/326; 318/314; 318/315; 318/319
[58] Field of Search ............... 318/313, 314, 315, 319, 318/326, 327, 329

[56] References Cited

U.S. PATENT DOCUMENTS

| | | | |
|---|---|---|---|
| 3,176,208 | 3/1965 | Gifft ...................................... | 318/314 |
| 3,206,665 | 9/1965 | Burlingham ..................... | 318/314 X |
| 3,522,503 | 8/1970 | Feulner ................................ | 318/314 |
| 3,559,018 | 1/1971 | Fournier ............................. | 318/314 |
| 3,764,876 | 10/1973 | Arthur ................................. | 318/326 |
| 3,858,100 | 12/1974 | Bussi et al. .......................... | 318/314 |
| 3,953,776 | 4/1976 | Wolf .................................. | 318/313 X |
| 4,401,923 | 8/1983 | O'Gwynn ....................... | 318/315 X |

*Primary Examiner*—Ulysses Weldon
*Attorney, Agent, or Firm*—Kevin R. Peterson; Edmund M. Chung; Robert A. Green

[57] ABSTRACT

A speed control circuit for a motor having a drive shaft which carries an optical encoder which generates pulses whose frequency is representative of the speed of the motor. The circuit includes a clock and a counter which generate a count between pulses, and a digital-to-analog converter (DAC) designed to receive each such count and to generate therefrom a corrective signal for maintaining the proper speed of the motor.

5 Claims, 1 Drawing Figure

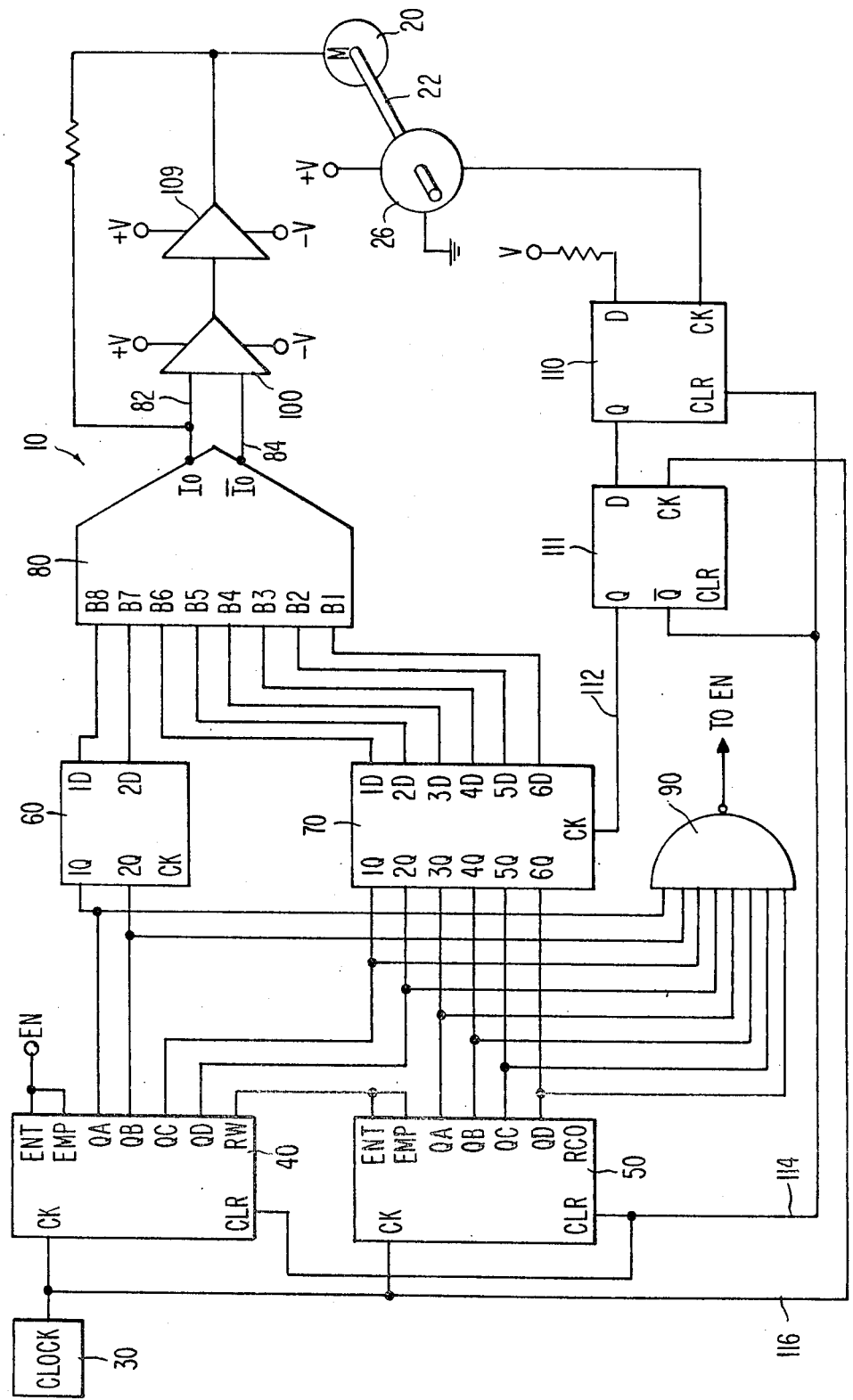

D.C. SERVO MOTOR SPEED REGULATOR

BACKGROUND OF THE INVENTION

The control of the speed of a motor is a requirement found in many applications. In particular, one type of ink jet printing apparatus uses a rotating print head, and the speed of the motor which rotates this print head must be accurately controlled.

DESCRIPTION OF THE DRAWING

The drawing is a schematic representation of a circuit for controlling the speed of a D.C. servo motor.

DESCRIPTION OF THE INVENTION

Referring to the drawing, the motor to be controlled is represented by the reference numeral 20. The motor shaft 22 carries an optical encoder disk 26 which is used to generate pulses, as the shaft turns at a frequency which is proportional to the speed of the motor.

The circuit for controlling the speed of this motor includes a clock 30 which is coupled to two counter modules, for example, LS163 modules 40 and 50. The circuit also includes two latch modules 60 and 70 and a digital-to-analog converter (DAC) 80 connected for bipolar operation. The outputs QA and QB of counter 40 are connected to terminals 1Q and 2Q of latch module 60, and terminals QC and QD are connected to terminals 1Q and 2Q of latch module 70. The QA, QB, QC, and QD terminals of the second counter 50 are connected, respectively, to terminals 3Q, 4Q, 5Q, and 6Q of the second latch module 70. Each of the Q terminals of the two modules are also connected as inputs to an eight-input NAND gate 90, the output of which is connected to the commonly connected ENT and ENP terminals of the first counter 50.

The outputs of the two latch modules 60 and 70 are connected to the inputs of the digital-to-analog converter 80. The two outputs of the DAC Io and $\overline{Io}$ are connected by leads 82 and 84, respectively, to the inputs of module 100, which converts the bipolar output currents of the DAC to voltages which are coupled to the input of an amplifier 109, the output of which is connected to one terminal of the motor 20. Module 100 may be an op amp such as the National Semiconductor LM301.

The encoder disk 26 is electrically coupled to the clock input CK of a flip flop 110 which is connected in series with a second flip-flop 111. The terminal Q of flip-flop 111 is coupled by lead 112 to the clock inputs CK of the latches 60 and 70. The $\overline{Q}$ terminal of flip-flop 111 is connected by lead 114 to the clear terminal CLR of the counters 40, 50 and of flip-flop 110. The CK terminal of flip-flop 111 is coupled by lead 116 to the CK terminals of counter modules 40 and 50. The flip-flops 110 and 111 synchronize the encoder pulses with the clock 30 and generate the reset pulses for the circuit.

In operation of the invention, the DAC 80 is operated as a bipolar current output device, and the purpose of the circuit is to count the number of high speed clock pulses from clock 30 between encoder pulses from encoder 26, and the number of such clock pulses is related to the speed of the motor. The DAC is set up to make a maximum of 256 counts, and it is arranged to provide an output pulse of one polarity if the pulse count between encoder pulses is less than 128 and an output pulse of the opposite polarity if the count is greater than 128.

In operation, as the motor shaft turns, the encoder 26 generates pulses which are applied to flip-flop 110. After each encoder pulse and before the next, the counters are enabled and enter a count whose magnitude is related to the spacing between encoder pulses and thus to the speed of the motor. When an encoder pulse is received by flip-flop 110, the flip-flops operate to (1) latch into the latches 60 and 70 and into the DAC, the count which the counters 40 and 50 had reached, and (2) clear the counters 40 and 50. The output of flip-flop 111 on lead 116 also enables the counters to begin to count again. When the DAC receives the count, it compares the count with 128 and provides a + or − output current to the motor to speed it up or slow it down as determined by the relationship of the count to 128. At the same time that the encoder pulse has caused a count to enter the latches and the DAC, as noted above, it also acts through flip-flops 110 and 111 to cause the counters to begin to count again until the next encoder pulse is received.

The AND gate 90 prevents the counters from counting after they have reached the maximum count of 256.

What is claimed is:

1. A motor speed control system comprising
   a motor having a drive shaft,
   pulse generating means on said drive shaft for generating pulses whose spacing is representative of the speed of the motor,
   a clock,
   a counter coupled to said clock,
   latch means for latching therein the count present in said counter at the time one of said pulses is generated,
   a bi-polar digital-to-analog converter coupled to receive said count from said latch means and to generate a positive or negative voltage therefrom for modifying the speed of said motor, and
   means for resetting said counter to zero and starting said counter counting again each time one of said pulses is generated and the count in the counter is transferred to said latch means and to said converter.

2. The system defined in claim 1 wherein said pulse generating means comprises an optical encoder mounted on the drive shaft of said motor.

3. The system defined in claim 1 wherein said converter is connected for bi-polar operation and generates a positive signal when the count received deviates from a predetermined count in one direction and generates a negative pulse signal when the count received deviates from said predetermined count in the other direction.

4. A motor speed control system comprising
   a motor having a drive shaft,
   first means on said drive shaft adapted to generate pulses whose frequency is representative of the speed of the motor,
   a counter,
   a clock coupled to said counter,
   a digital-to-analog converter adapted to receive input signals representative of a count in said counter,
   said converter being connected in bi-polar mode so that it provides positive or negative output signals about a predetermined count value, depending on the number of counts applied at its input,
   a latch circuit having its outputs coupled to the inputs of said converter, said counter being coupled to the input of said latch circuit, and circuit means coupled to said first means on said drive shaft for (1) receiving a pulse therefrom and then (2) latching the then present count in said counter into the latches, the latched count being coupled to the input of said digital-to-analog converter, and resetting the counter to zero, and (3) enabling the clock to cause the counter to count again; each count entered in the converter being compared with the previously stored count whereby the converter provides a positive or negative output signal to the motor to properly adjust its speed.

5. The system defined in claim 4 wherein said first means comprises an optical encoder.

* * * * *